United States Patent [19]
Janin et al.

[11] 3,931,254
[45] Jan. 6, 1976

[54] PROCESS FOR THE PREPARATION OF ANTHRAQUINONE

[75] Inventors: Raymond Janin, Allee F. Irigny;
Leon Krumenacker,
Serezin-du-Rhone, both of France

[73] Assignee: Rhone-Poulenc S.A., Paris, France

[22] Filed: May 8, 1974

[21] Appl. No.: 468,140

[30] Foreign Application Priority Data
May 11, 1973  France .............................. 73.17156

[52] U.S. Cl. ................................................ 260/385
[51] Int. Cl.² ...................... C07C 49/68; C09B 1/06
[58] Field of Search ..................................... 260/385

[56] References Cited
UNITED STATES PATENTS

| | | | |
|---|---|---|---|
| 1,787,416 | 12/1930 | Wohl | 260/385 |
| 1,787,417 | 12/1930 | Wohl | 260/385 |
| 1,880,322 | 10/1932 | Jaeger | 260/385 |
| 2,643,269 | 6/1953 | Augustine | 260/385 X |
| 2,824,881 | 2/1958 | Wettstein | 260/385 |

OTHER PUBLICATIONS

Crocker et al., "J. Chem. Soc.," 1970(c), pp. 1982–1986, 1970.

*Primary Examiner*—Paul F. Shaver
*Attorney, Agent, or Firm*—Cushman, Darby & Cushman

[57] ABSTRACT

A simple process for preparing anthraquinone in good yield from anthracene is described, which process comprises oxidising anthracene by means of oxygen or an oxygen-containing gas in the liquid phase, in an inert organic diluent, in the presence of a halogen-copper bond free copper derivative.

11 Claims, No Drawings

PROCESS FOR THE PREPARATION OF ANTHRAQUINONE

The present invention relates to a process for the preparation of anthraquinone by oxidation of anthracene by means of oxygen or a gas containing it.

Anthraquinone is a compound of great industrial value, particularly in the manufacture of dyestuffs. Various processes have been proposed for the preparation of anthraquinone, especially from phthalic anhydride (condensation with benzene in the presence of anhydrous aluminium chloride to yield benzoylbenzoic acid which is converted to anthraquinone with sulphuric acid). It has also been proposed to oxidise anthracene to anthraquinone in the liquid phase by means of an oxidising agent such as nitric acid or a dichromate, or in the vapour phase by means of oxygen or air in the presence of a catalyst such as vanadium pentoxide. These various processes are not completely satisfactory either because of the reagents employed or because of the reaction conditions, it is clearly important to have available a simple process for the oxidation of anthracene by means of oxygen or a gas containing it, in the liquid phase. During an investigation into the halogenation of aromatic compounds, especially phenols and amines, by means of cupric chloride in the presence of oxygen and hydrochloric acid in 1,5-dimethoxy-3-oxa-pentane (diglyme), H. P. CROCKER and R. WALSER (J. Chem. Soc. 1970, 1982–1986) mentioned the formation of anthraquinone from anthracene, but it was found that under these conditions the halogenation reaction leads predominantly to the formation of 9-chloroanthracene which deprives such a process of any value as an industrial method for the preparation of anthraquinone.

According to the present invention there is provided a process for the preparation of anthraquinone by oxidation of anthracene by means of oxygen or a gas containing it in an inert organic diluent in the presence of a copper derivative which does not contain any halogen bonded directly to the metal.

Suitable diluents for use in the process of this invention include linear or branched saturated aliphatic alcohols containing 1 to 10 carbon atoms, and compounds of the general formula:

$$R_1O\text{---}[R'\text{---}O\text{---}]_n R_2 \qquad (I)$$

in which $R_1$ and $R_2$, which may be identical or different, denote a hydrogen atom or a linear or branched alkyl radical containing 1 to 5 carbon atoms, $R'$ denotes a linear or branched alkylene radical containing up to 10 carbon atoms, and n is an integer from 1 to 3.

More specifically, $R_1$ and $R_2$ can be, for example, a methyl, ethyl or propyl radical and $R'$ can be, for example, an ethylene, propylene, tetramethylene, pentamethylene, hexamethylene or octamethylene radical.

Specific examples of diluents which may be used include methanol, ethanol, propanol, isopropanol, 1-butanol, isoamyl alcohol, tertiary amyl alcohol, n-pentanol, 1-hexanol, the octanols, ethylene glycol, 2-methoxy-ethanol, 1,2-dimethoxy-ethane, propane-1,2-diol, propane-1,3-diol, 3-methoxy-2-propanol, 1,3-dimethoxy-propane, 2-methyl-propane-1,3-diol, 2,2-dimethyl-propane-1,3-diol, butane-1,4-diol, butane-2,3-diol, pentane-1,5-diol, hexane-1,6-diol, diethylene glycol, triethylene glycol, dipropylene glycol, tripropylene glycol and 1,5-dimethoxy-3-oxa-pentane. Amongst these, the non-condensed glycols are preferred, especially ethylene glycol.

It is, of course, possible to use a mixture of organic diluents; it is also possible for the reaction mixture to contain water.

The copper derivatives used to oxidise anthracene to anthraquinone are preferably cupric derivatives of copper, although cuprous derivatives of copper which can be oxidised to cupric derivatives under the reaction conditions can also be employed. Amongst the cupric derivatives which are suitable for carrying out the process, there may be mentioned: salts of inorganic acids such as cupric sulphate; cupric nitrate; cupric phosphates; copper borates; cupric cyanide, copper cuprocyanide; and salts of aliphatic, cycloaliphatic or aromatic carboxylic acids such as cupric formate and cupric acetate; basic cupric acetates; cupric propionate, cupric butyrate, cupric caproate, cupric octoate, cupric resinate, cupric naphthenate, cupric benzoate and cupric salycilate.

In addition to the copper derivatives mentioned above, use can also be made of chelates or complexes of cupric copper with electron pair donor compounds such as heterocyclic bases which are optionally substituted by functional groups; such as pyridyl; dipyridyl; piperidine; quinoline; isoquinoline; phenanthroline; and 8-hydroxyquinoline; phenols, phosphines; arsines and stibines.

Amongst the compounds mentioned above, the copper salts of non-halogenated inorganic acids and carboxylic acids are preferably used. Cupric sulphate is especially suitable.

It has also been found that it is advantageous to carry out the reaction in the presence of one or more iron halides, aluminium halides and halides of elements from Group 3A, 4A and 5A of the Periodic Table of the elements as given in "Handbook of Chemistry and Physics", 45th edition, 1964, page B-2, which exert an accelerating effect on the rate of oxidation. These compounds will hereafter be called "activators". Amongst the halides of elements from Groups 3A, 4A and 5A, there may be mentioned boron trifluoride, antimony pentachloride, antimony trichloride, antimony tribromide, antimony trifluoride and pentafluoride, antimony pentaiodide, arsenic tribromide, arsenic trichloride, arsenic trifluoride, and bismuth trichloride and tetrachloride. Amongst these various compounds, the antimony derivatives and especially antimony pentachloride are particularly suitable.

It has also been found that inorganic acids with a pK in water of less than 2 (with the exception of hydrochloric acid), such as sulphuric, nitric, pyrophosphoric or hydrobromic acids, also exert an activating effect on the reaction.

The quantity of copper derivatives, expressed in gram atoms of copper per mol of anthracene, can vary within wide limits. It is suitably at least $1 \times 10^{-5}$ gram atom of copper per mol of anthracene. In general, there is no need to introduce more than 2 gram atoms of copper per mol of anthracene, although this limit can be exceeded.

The quantity of activator can also vary within wide limits, depending on the nature of the compound used. In general, quantities of from $1 \times 10^{-5}$ mol to 2 mols per mol of anthracene are quite suitable. However, the latter limit can be exceeded without disadvantage.

The temperature at which the reaction is carried out is suitably from 20° to 200°C. A temperature of from 20° to 180°C is generally quite suitable. The oxidation is suitably carried out under a partial oxygen pressure of 0.1 to 20 bars. When the diluent or the activator such as boron trifluoride, arsenic trifluoride or arsenic pentafluoride is gaseous at the chosen temperature, it is preferable to work under a sufficient pressure to maintain them in the liquid state in the reaction medium.

In addition to oxygen, it is possible to use mixtures of oxygen with inert gases such as nitrogen, as the oxidising gas. Typically air, optionally enriched with oxygen, is used.

The process according to the present invention is particularly simple to effect on a technical scale and can be carried out continuously.

The following Examples further illustrate the present invention.

EXAMPLE 1

7.12 g of anthracene ($4 \times 10^{-2}$ mol), 0.937 g. of anhydrous $CuSO_4$ ($6 \times 10^{-3}$ mol) and 120 cm$^3$ of ethylene glycol are introduced into a 250 cm$^3$ flask equipped with a reflux condenser, a thermometer, a dip tube for supplying gas, a stirring system and a thermoregulated heating device; then the contents of the flask are heated to 140°C with stirring and a stream of oxygen is supplied at a rate of 4 l/hour under normal conditions of pressure and temperature. These conditions are maintained for 8 hours and then the contents of the flask are cooled to 20°C and poured into a sufficient quantity of water to bring the total volume to 1 liter, which brings about the precipitation of the dissolved anthracene. The mixture is left to stand at ambient temperature for 12 hours and is then filtered through sintered glass. The precipitate obtained is dried to constant weight over $P_2O_5$. In this way, 7.91 g. of a product are collected, in which 5.15 g of anthracene (degree of conversion 27.5%) and 2.2 g of anthraquinone (corresponding to a yield of 96.5% relative to the converted anthracene) are measured by chromatography on alumina.

EXAMPLE 2

The procedure of Example 1 is followed, but in the presence of 0.2 cm$^3$ of $SbCl_5$ (corresponding to $0.15 \times 10^{-2}$ mol). At the end of the reaction, 7.75 g. of a product are isolated, in which 3.92 g. of anthracene (degree of conversion 45%) and 3.67 g. of anthraquinone (corresponding to a yield of 98% relative to the converted anthracene) are measured.

EXAMPLE 3

The procedure of Example 2 is followed, replacing the cupric sulphate by 0.735 g. of anhydrous cupric acetate (corresponding to $6 \times 10^{-3}$ mol). At the end of the reaction, 8.01 g. of a product are isolated, in which 2.02 g. of anthracene (corresponding to a degree of conversion of 71.4%) and 5.8 g. of anthraquinone (corresponding to a yield of 95.5% relative to the converted anthracene) are measured.

EXAMPLE 4

7.12 g. of anthracene, 0.957 g. of $CuSO_4$ and 120 cm$^3$ of ethylene glycol are introduced into a 250 cm$^3$ autoclave made of stainless steel lined with tantalum, and then the autoclave is closed and air is introduced into it to a pressure of 30 bars. The contents of the apparatus are then heated at 140°C for 5 hours 25 minutes. After cooling to 20°C, the reaction mixture is treated as in Example 1. 7.43 g. of a product containing anthracene (44.5% of the quantity introduced) and anthraquinone representing 51.2% of the anthracene introduced are collected. The yield of anthraquinone is 93% relative to the converted anthracene.

EXAMPLE 5

The procedure of Example 4 is followed, but 0.2 cm$^3$ of $SbCl_5$ is also introduced. At the end of the reaction, 7.89 g. of a product containing 23.6% of the anthracene introduced and anthraquinone representing 74.5% of the anthracene introduced are recovered. The yield of anthraquinone relative to the converted anthracene is 97.5%.

We claim:

1. In a process for the preparation of anthraquinone which comprises oxidising anthracene by means of oxygen or an oxygen-containing gas in the liquid phase, in an inert organic diluent, in the presence of a copper salt, the improvement wherein the copper salt is a halogen-copper bond free copper salt of an inorganic or carboxylic acid and the organic diluent is a compound of the general formula:

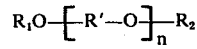

in which $R_1$ and $R_2$ denote a hydrogen atom, $R'$ denotes a linear or branched alkylene radical containing up to 10 carbon atoms, and n is an integer from 1 to 3.

2. Process according to claim 1 in which the copper derivative is cupric sulphate.

3. Process according to claim 1 in which the copper derivative is cupric acetate.

4. Process according to claim 1, in which the diluent is ethylene glycol.

5. Process according to claim 1 in which the reaction is carried out at a temperature from 20° to 200°C with an oxygen partial pressure from 0.1 to 20 bars.

6. Process according to claim 1 in which the copper derivative is present in an amount of at least $1 \times 10^{-5}$ gram atom of copper per mol of anthracene.

7. Process according to claim 1 in which anthracene is oxidised in ethylene glycol in the presence of cupric sulphate and antimony pentachloride.

8. Process according to claim 1 which is carried out in the presence of at least one activator which is an iron halide, an aluminum halide, boron trifluoride, an antimony halide, an arsenic halide and a bismuth halide, or an inorganic acid with a pK in water of less than 2 other than hydrochloric acid.

9. Process according to claim 8, in which the activator is antimony pentachloride.

10. Process according to claim 8 in which the activator is present in an amount of at least $1 \times 10^{-5}$ mol per mol of anthracene.

11. Process according to claim 1 in which n is 1.

* * * * *